(12) United States Patent
Morikawa et al.

(10) Patent No.: US 7,256,902 B1
(45) Date of Patent: Aug. 14, 2007

(54) NETWORK PRINTING SYSTEM THAT OPERATES BASED ON THE ENVIRONMENT

(75) Inventors: Takeshi Morikawa, Okazaki (JP); Yoshikazu Ikenoue, Toyohashi (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 869 days.

(21) Appl. No.: 09/679,070

(22) Filed: Oct. 5, 2000

(30) Foreign Application Priority Data

Oct. 7, 1999 (JP) .................................. 11-286857

(51) Int. Cl.
*G06F 15/00* (2006.01)
*G06K 1/00* (2006.01)
*G06K 15/00* (2006.01)

(52) U.S. Cl. .................................... 358/1.14; 358/1.15

(58) Field of Classification Search .......... 358/1.1–1.9, 358/1.11–1.18; 270/1.01, 32, 37, 58.08
See application file for complete search history.

(56) References Cited

U.S. PATENT DOCUMENTS

| | | | | |
|---|---|---|---|---|
| 4,925,325 A | * | 5/1990 | Niikawa | 400/582 |
| 5,129,639 A | * | 7/1992 | DeHority | 270/1.01 |
| 5,241,349 A | * | 8/1993 | Nagasaka | 399/70 |
| 5,467,434 A | * | 11/1995 | Hower et al. | 358/1.15 |
| 6,160,629 A | * | 12/2000 | Tang et al. | 358/1.1 |

FOREIGN PATENT DOCUMENTS

| | | |
|---|---|---|
| JP | 07-001791 | 1/1995 |
| JP | 07-046336 A | 2/1995 |
| JP | 10-016356 | 1/1998 |
| JP | 11-146103 A | 5/1999 |
| JP | 11-242571 | 9/1999 |
| JP | 11-249846 A | 9/1999 |

OTHER PUBLICATIONS

Office Action issued by the Japanese Patent Office on May 17, 2005, with English translation.

* cited by examiner

*Primary Examiner*—King Y. Poon
(74) *Attorney, Agent, or Firm*—Buchanan Ingersoll & Rooney PC

(57) ABSTRACT

The object is to provide a network printing system in which printing may be executed using stable print modes regardless of the printer operating environment. When the printer receives a print job, if (i) any of the printing parameters in the print mode associated to the print job is registered as prohibited and (ii) the current time is within a designated time frame in which no one is expected to be near the printer, printing using prohibited printing parameters is not performed. The situation in which the printer is kept on suspended for a long period of time is prevented by changing such printing parameters to other available printing parameters, or by deleting the print job.

17 Claims, 11 Drawing Sheets

NETWORK PRINTING SYSTEM THAT OPERATES BASED ON THE ENVIRONMENT

This application is based on application No. 11-286857 filed in Japan, the content of which is hereby incorporated by reference.

BACKGROUND OF THE INVENTION

1. Field of the Invention

The present invention pertains to a network printing system capable of transmitting to a printer through a network a command to operate, in order to cause the printer to begin a printing operation.

2. Description of the Related Art

In a printing system of this sort, when a print request is input to the printer through an operation on the side of the host comprising a personal computer (PC), for example, and a print command and image data that correspond to the print mode are transmitted to the printer, the printer sets the print mode in accordance with the print command and prints out the image data. Upon receiving the print command, the printer displays messages in its operation panel or the personal computer's display screen requesting, for example, paper supply when the A4-size paper cassette is empty, or toner supply when the toner has been consumed.

However, in an environment in which paper or toner cannot be immediately replenished because the printer is used through a network and there is no one located near the printer, such as at a print shop at night where the manager is not present, or when a large number of computers are connected through a network to the printer, which is located in a remote place in an office, the problem arises that the printing operation may be suspended after printing is requested, and printing may not be performed.

SUMMARY OF THE INVENTION

The present invention is created in order to solve the problem identified above. An object of the present invention is to provide a network printing system that can perform printing in a stable print mode regardless of the operating or use environment of the printer.

In order to attain the object, the printing system of the present invention including a printer that operates in either a first operating environment or a second operating environment that is different from the first operating environment, the printing system comprises: a print parameter prohibiting means that prohibits use of a printing parameter associated with a print job; an operating environment detector that determines whether the printer operating environment is the first operating environment or the second operating environment; a parameter determiner that receives a print job and determines whether a printing parameter to be used in the print job is prohibited by the print parameter prohibiting means; and a controller that, when the parameter determiner determines that a printing parameter is prohibited and the operating environment determining means detects that the environment is the first operating environment, prohibits processing of the print job using the print parameter prohibited.

Using the printing system, where it is determined that the printing parameters to be used in the print job received are prohibited and the operating environment is the first operating environment, the controller prohibits the performance of the print job using the printing parameter, which are prohibited. Consequently, a printing operation using a print mode that would not allow a stable printing operation is not carried out, and therefore, in an operating environment offering inadequate support for the printer, printing may be performed only using modes that allow stable printing operation.

Another printing system of the present invention including a printer, comprises an operating environment setting means that sets a first operating environment as the operating environment for the printer, as well as a second operating environment that is different from the first operating environment; a print parameter prohibiting means that prohibits the use of printing parameters associated with print jobs; an operating environment detector that determines whether the printer operating environment is the first operating environment or the second operating environment; a parameter determiner that determines whether or not a printing parameter of a print job is prohibited by the print parameter prohibiting means; and a controller that, when the parameter determiner determines that a printing parameter is prohibited, executes a different print mode based on the determination by the operating environment detector.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

An embodiment of the present invention is explained below with reference to the accompanying drawings.

Figure 10:
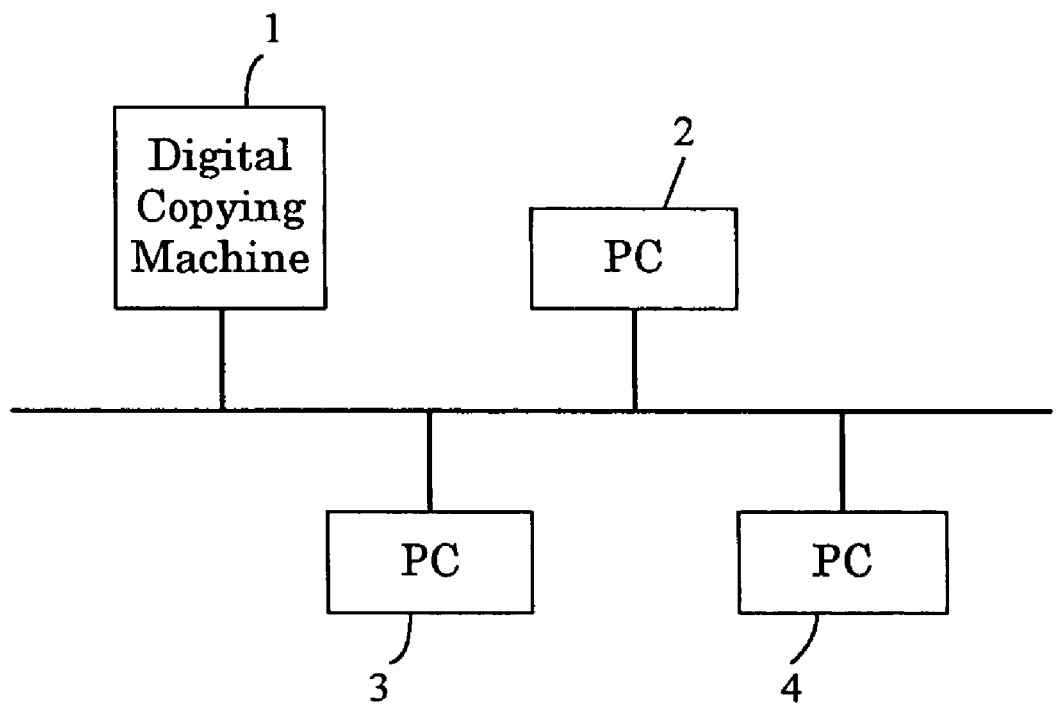
FIG. 10 is a drawing showing an example of network for the network system.

The network printing system in this embodiment comprises a digital copying machine 1 that is used as a multifunction machine of copying machine and printer, and has a post-printing processing device that functions as a paper eject path switching device. One or more computers 2, 3 and 4 are connected to the digital copying machine 1 through a network, as shown in FIG. 10. The digital copying machine 1 that receives a print job from a computer functions as a printer.

The digital copying machine 1 mainly comprises an image reader IR, a page printer PRT and a post-printing processing device 600.

The image reader IR comprises a scanning unit 10 that reads the original document placed on the platen glass 18 as image data, an image processor 20 that performs quantization and signal processing of the photoelectrically converted signals output from the scanning unit 10 in accordance with the various image formation parameters, a main unit 200 that has a memory unit 30 that stores the image data corresponding to the image of the original document, and an automatic document feeder 500 that is located on top of the main unit 200 and may be used as a platen cover that may be opened and closed using its rear end as the fulcrum.

The scanning unit 10 is a line-scanning image reading mechanism, and comprises a scanner 19 having a lamp 11 to illuminate the original document and a mirror 12, a scan motor M2 to drive the scanner 19, fixed mirrors 13a and 13b, a converging lens 14, and an image sensor 16 comprising a CCD array.

The automatic document feeder 500 conveys the original document placed on the original document stacker 510 to the platen glass 18 by means of a paper supply roller 501, a feeding roller 502, a separation pad 503, an intermediate roller 504, a resist roller 505 and a conveyance belt 506, and ejects the original document onto the original document ejection tray 511 by means of an eject roller 509 after reading the original document. The automatic document feeder 500 also has an original document scale 512, an original document sensor SE50 that detects whether an original document exists, an original document size sensor SE51, and an eject sensor SE52. 200 indicates an operation panel.

The page printer PRT has a print processor 40 that outputs exposure control signals, a print head 60 using a semiconductor laser 62 as a light source, a developing/transfer unit 70A comprising a photoreceptor drum 71 and its peripheral devices, a fusing/eject unit 70B comprising a pair of fusing rollers 84 and a pair of eject rollers 85, and a circulating sheet conveyance system 70c including a post-printing processing device 600. The page printer PRT prints out an image through the electrophotographic process based on the image data transferred from the image reader IR.

Two paper cassettes 80a and 80b that can each house several hundred sheets, paper size detection sensors SE11 and SE12 and paper supply rollers R1 and R2 are located in the lower part of the page printer PRT.

The post-printing processing device 600 incorporates a paper resupply unit comprising reversing rollers 603, a switching claw 604 and a conveyance guide that leads the sheet to the rollers 86a and 86b shown in the drawing, and is constructed such that it may selectively alternate among automatic two-sided copying, straight ejection of the copy sheet, which is explained below, and reverse ejection.

The post-printing processing device 600 has a conveyance roller 602 that conveys the copy sheet as to which image printing has been completed, switching claws 601 and 604, reversing rollers 603 that flip over the copy sheet which is being conveyed, where necessary, a paper sensor SE61 that detects the position of the copy sheet, a straight ejection tray 621 onto which the copy sheet is ejected face up, and a reverse ejection tray 631 onto which the copy sheet is ejected face down. This reverse ejection tray 631 is constructed such that it moves down depending on the number of copy sheets placed on it and moves up back to the original level when the copy sheets are removed, such that a large number of copy sheets may be placed on it.

The printing operation performed by the digital copying machine described above will now be explained.

Where printing is performed of an original document comprising two or more pages, for example, the operator places the original document on the original document stacker 510 such that the pages are placed one on top of another with the image sides facing up. Because the digital copying machine 1 of this embodiment is constructed such that the original document is fed into the machine beginning with the top page, each original document on the original document stacker 510 is pulled out by means of the supply roller 501 starting with the top page.

The supply roller 501 may be pressed onto or retracted away from the original document by means of a solenoid not shown in the drawing. It is pressed onto the original document when the placement of an original document is detected, and when the original document is gone, the supply roller 501 is retracted upward.

The original document that has been pulled out by the supply roller 501 is accurately set at the reading position on the platen glass 18 with the image side facing down. After reading of the image is completed, the original document is sent in the direction of the arrow A in the drawing. It is then flipped over by the reversing roller 507 and is ejected with the image side facing down.

Where the original document has images on both sides of the page, the original document is flipped over by the reversing roller 507 after the image on one side is read through the routine described above, and is returned to the reading position on the platen glass 18. After the image formed on the other side is read, the original document is conveyed in the direction of the arrow A once more.

The image that has been read using the routine described above is output to the page printer PRT via the image signal processing unit 20 and memory unit 30 described below, and is printed out on a sheet of paper. In other words, in the page printer PRT, a laser beam irradiated from the semiconductor laser 62 is deflected by the polygon mirror 65 in the main scanning direction and led to the exposure position for the photoreceptor drum 71 via the main lens 69 and various mirrors 67a, 68 and 67c.

The surface of the photoreceptor drum 71 is uniformly charged by means of the charger 72. The latent image formed through exposure becomes a toner image after it passes the developing device 73, and the toner image is separated from the photoreceptor drum 71 by being transferred to a recording sheet in the transfer area (copying area) by means of the transfer chargers 74 and 75. This recording sheet is then ejected from the page printer PRT to the post-printing processing device 600 as a copy sheet by means of the conveyance belt 83, with the image side facing up.

The copy sheet ejected from the page printer PRT is ejected as is (straight ejection) or flipped over and ejected by means of the post-printing processing device 600.

The operations for straight ejection and reverse ejection are explained below for one-sided copying and two-sided copying, respectively.

Straight ejection means that the copy sheet ejected from the page printer PRT face up is ejected onto the straight ejection tray 621 with the same side facing up, while reverse ejection means that the copy sheet ejected from the page printer PRT face up is reversed inside the post-printing processing device 600 and is then ejected onto the reverse ejection tray 631. Therefore, all copy sheets ejected via straight ejection are ejected face up, while all copy sheets ejected via reverse ejection are ejected face down.

1. One-Sided Copying/Straight Ejection

The copy sheet ejected by means of the eject rollers 85 of the pager printer PRT with the image side up is held horizontally in that state by the switching claw 601, and ejected onto the straight ejection tray 621.

2. One-Sided Copying/Reverse Ejection

The copy sheet ejected from the page printer PRT by means of the eject rollers 85 reaches the reversing rollers 603 because the switching claw 604 maintains it in a vertical position. When this occurs, since the left end of the switching claw 601 moves up, the copy sheet is led to the conveyance rollers 602. When the trailing edge of the copy sheet reaches the sheet sensor SE61, the reversing rollers 603 rotate backward. Due to the backward rotation of the reversing rollers 603, the copy sheet becomes reversed and reaches the switching claw 604 once more. When this occurs, because the bottom end of the switching claw 604 has moved to the left in advance, the copy sheet is ejected onto the reverse ejection tray 631.

3. Two-Sided Copying/Straight Ejection

A sheet that has an image printed on one side only is ejected from the page printer PRT by means of the eject rollers 85. When this occurs, the left end of the switching claw 604 moves up, and leads the sheet to the conveyance rollers 602.

A sheet that has passed through the conveyance rollers 602 reaches the reversing rollers 603 by means of the switching claw 604 that is maintaining it a vertical position. When the sheet reaches the reversing rollers 603 and the trailing edge of the sheet is detected by the sheet sensor SE61, the reversing rollers 603 begin to rotate backward, whereupon the sheet moves back and reaches the switching claw 604 once more.

When this occurs, the bottom end of the switching claw 604 has moved to the right in advance, so that the copy sheet is returned to the page printer PRT. The sheet that has returned to the page printer PRT passes through the horizontal conveyance rollers 86a, 86b and 86c inside the page printer PRT and is sent to the timing rollers 82, where it stands by and waits for the next operation.

Where multiple sheets are supplied on a continuous basis, they are sequentially sent into the post-printing processing device 600 at certain intervals so that they do not overlap with each other.

Incidentally, because the sheet conveyance path is fixed, the number of sheets N that can exist in one cycle by means of the post-printing processing device 600 and horizontal conveyance rollers 86a, 86b and 86c (the largest number of circulating sheets) depends on the size of the sheets.

The sheet that is sent to the timing rollers 82 undergoes image printing on the side on which an image has not been printed, and the sheet is ejected into the post-printing processing device 600 by means of the eject rollers as a copy sheet as to which printing has been completed. The post-printing processing device 600 ejects the copy sheet that has images printed on both sides onto the straight ejection tray 621 through the same sequence followed for the straight ejection of one-sided copy sheets, which is described above.

Figure 1:
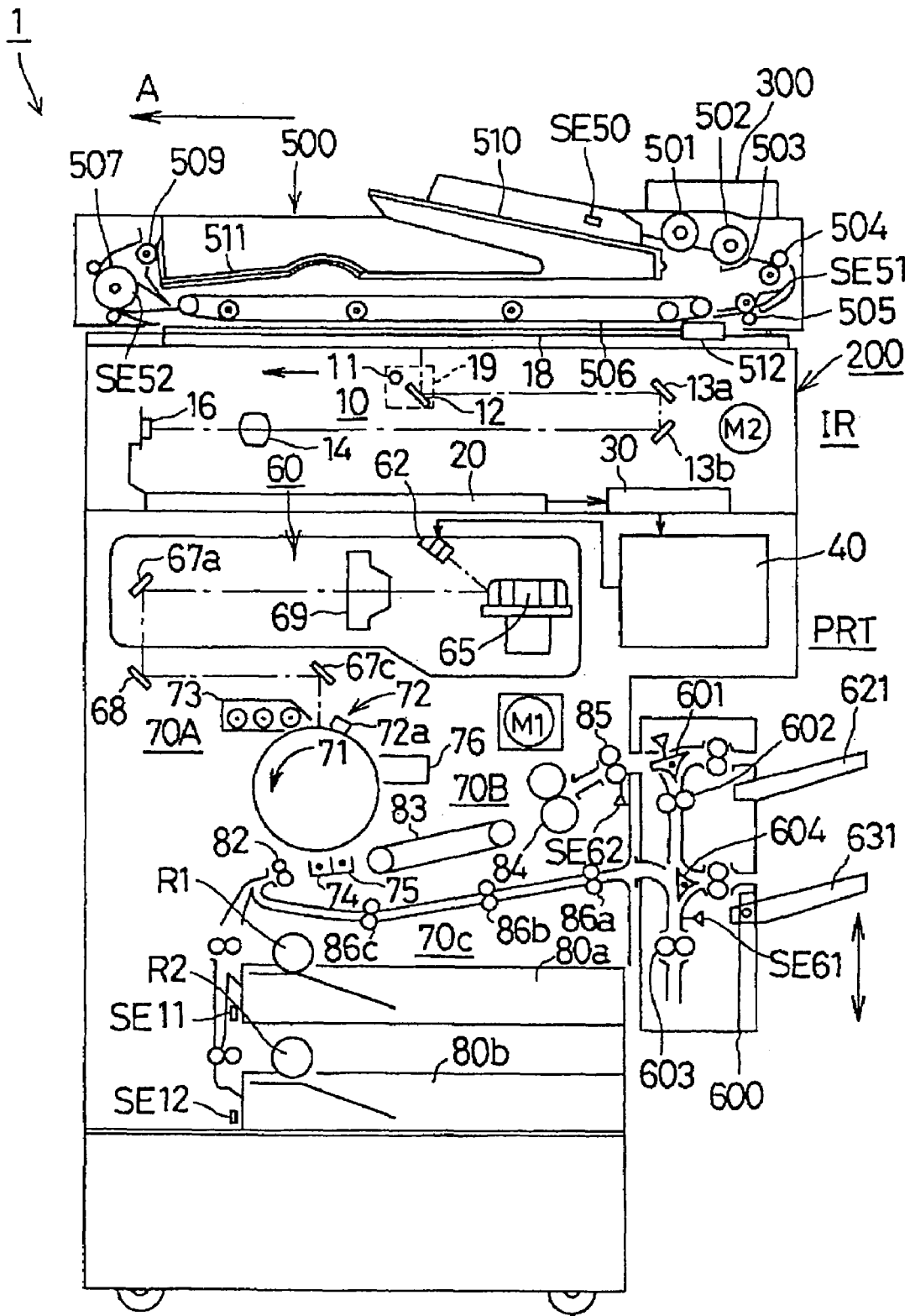
FIG. 1 is a cross-sectional view showing a digital copying machine applied in the network printing system pertaining to one embodiment of the present invention.
Figure 2:
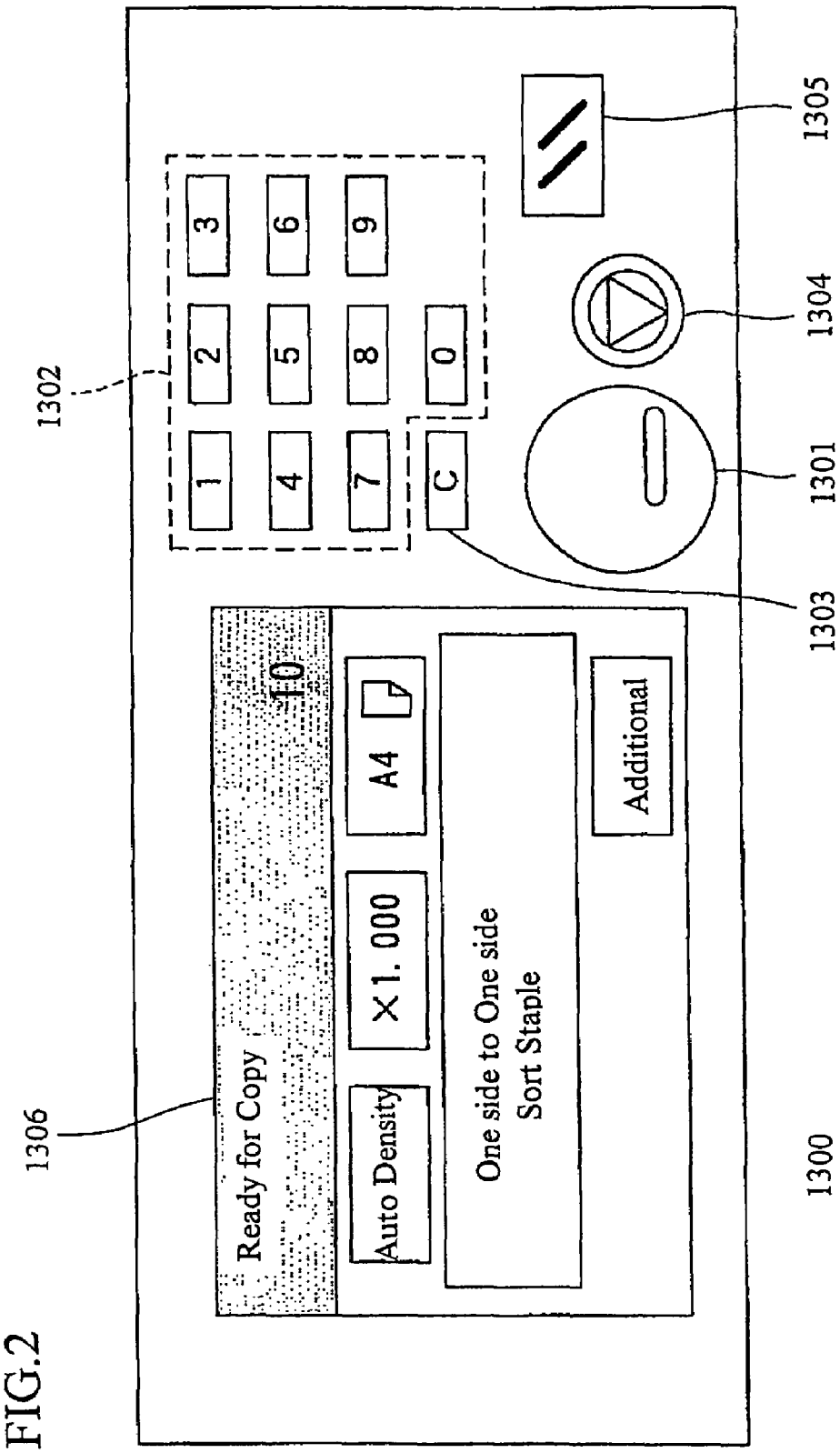
FIG. 2 is a plan view of the operation panel of the digital copying machine shown in FIG. 1.

FIG. 2 is a plan view showing the construction of the operation panel 1300 of the copying machine 1. The print start key 1301 is used to begin a copying operation, and the numeric keypad 1302 is used to input numbers such as the number of copies to be made. The clear key 1303 is used to clear the number that has been input or to delete the image data in the image memory 30. The stop key 1304 is used to pause the copying operation or the copying and reading operations, and the panel reset key 1305 is used to delete the current image mode as well as the current job.

The operation panel 1300 has a liquid crystal display unit 1306, and a touch panel is attached to the surface of this liquid crystal display unit 1306. Various settings may be made in accordance with the display contents on the liquid crystal display unit 1306 by means of this touch panel.

Figure 3A:
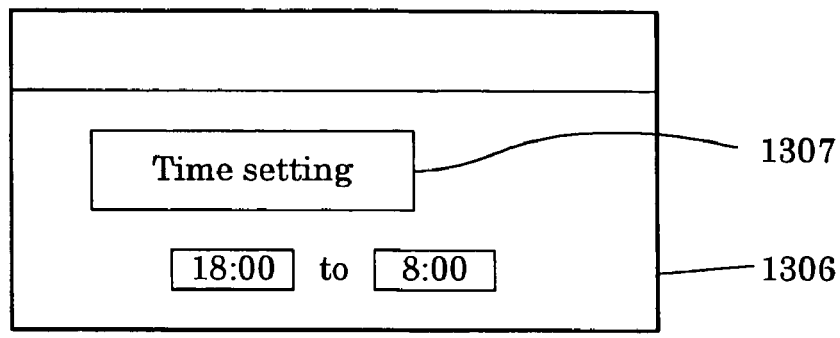
FIGS. 3A through 3F are plan views of the liquid crystal display unit used when various settings are made using the operation panel shown in FIG. 2.

A time frame may be set in this embodiment in order to set the operating environment for the printer. In other words, when the manager inputs a secret code through the touch panel, the time frame input screen shown in FIG. 3A becomes displayed. The time frame during which no one is working in the location where the copying machine 1 is located, i.e., a print shop or office, for example, may be set in this embodiment by means of the time frame setting key 1307, so that a time frame such as 18:00 to 8:00 may be set, depending on the business hours of the print shop or office. The touch panel is also used when specifying parameters that are to be prohibited during the designated time frame.

Furthermore, in this embodiment, the standard print mode and printing charges may be set by means of the touch panel. In other words, a standard print mode setting screen shown in FIG. 3B and a printing charges setting screen shown in FIG. 3C are displayed through the secret code input operation by the manager.

Figure 3B:
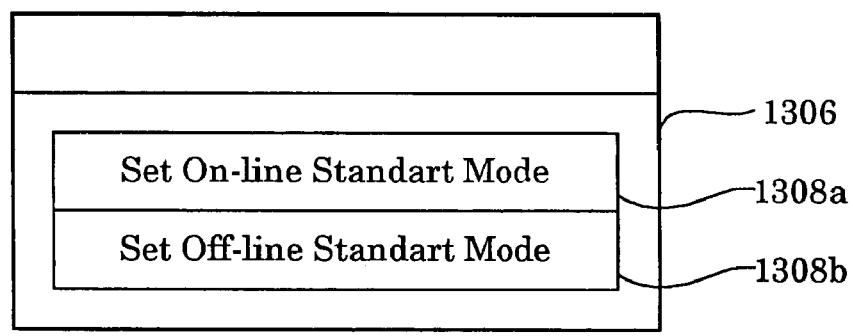
Figure 3C:
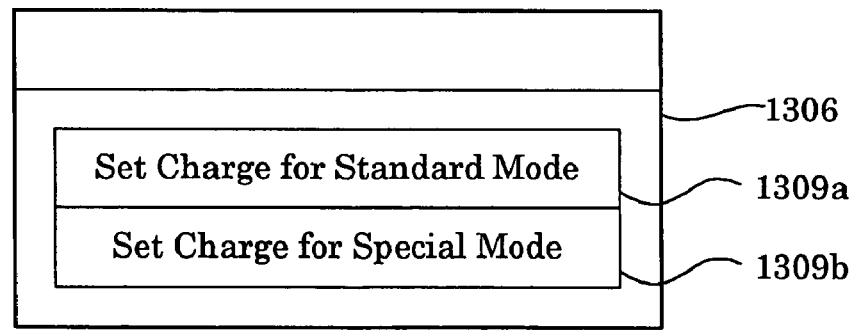

In the standard print mode setting screen shown in FIG. 3B, when the manager presses the standard mode setting keys 1308a or 1308b and inputs the parameter values, the print mode including these parameters becomes the standard mode, and the other printing parameters are included in special mode. In this embodiment, a regular charge is charged on a print job that includes a printing parameter designated as the standard mode, while a print job includes a printing parameter designated as the special mode are charged at a charge different from the regular charge. The parameters may include designation of paper supply inlet, size of paper, non-regular size paper and stapling, etc.

Furthermore, in this embodiment, a standard mode key 1308a for on-line printing and a standard mode key 1308b for off-line printing exist separately. The standard mode for on-line printing, in which a print command is sent from an external device other than the copying machine 1 (such as a personal computer), and the standard mode for off-line printing, in which the image is read in the image reader IR of the copying machine 1, may be separately specified. As an example, where the on-line mode is active, since it is likely that printing will be performed through remote control, and therefore that the manager or operator will not be near the printer, the parameters included in the standard mode are reduced to the extent possible. For example, the available paper size would be A4 only, only one-sided printing would be allowed, and no finishing modes may be set. Where the off-line mode is active, because it is more likely that the operator is near the printer than in the case of the on-line mode, the parameters included in the standard mode may be increased. For example, another paper size may be made available in addition to A4 size, and both sides printing may be allowed in the standard mode.

Parameters that are not registered in the standard mode are included in special mode. Examples of special mode include a mixed mode in which paper of two or more different sizes is used in a single job, a cover mode, a page insertion mode, and an OHP page insertion mode in which two or more types of paper, i.e., paper on which to output the images and other types of paper, need to be supplied. Other special mode include a 2-in-1 mode and 4-in-1 mode in which images for multiple original documents are output onto one recording sheet, a saving mode that is used for printing pages for bound weekly magazines, etc., and a mode that uses paper of a special size, which requires replacement of the paper supply inlet. Because the mode including these parameters requires some type of extra work on the part of the manager, they are included in special mode.

In a multi-job system that can accumulate more than one copy job, copy jobs that are performed simultaneously with the reading and printing operations for an original document may be handled in the same way as an off-line mode job, because it is highly likely that there is an operator taking care of the copy job is near the copying machine. Jobs that are printed after an original document image is read and the image data is saved during printing of a different job may be handled in the same way as an on-line mode job, because it is highly likely that the operator that issued the print command is not near the copying machine at the time of printing.

In the printing charge setting screen shown in FIG. 3C, the manager may set the printing charges for the standard mode and special mode by inputting them using the numeric keypad after pressing the standard mode charge setting key 1309a or the special mode charge setting key 1309b. The charges thus set are saved in the RAM 126.

Figure 3D:
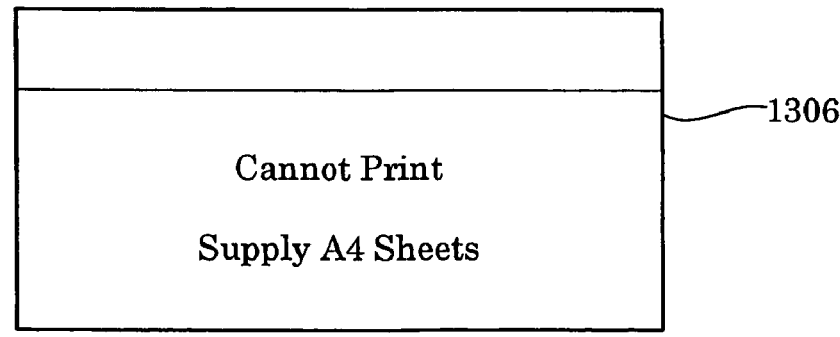

As shown in FIG. 3D, the liquid crystal display unit 1306 displays a warning in the event any of the parameters of the print job to be performed is prohibited. This function will be explained in more detail below.

When a parameter is to be registered as prohibited, "Prohibit" should be selected, causing the printer to enter a mode in which a parameter to prohibit may be registered, and the parameter to prohibit should then be designated. For example, color printing, printing using a special type of paper, high volume printing exceeding a certain volume, etc., may be designated as a prohibited parameter.

Figure 3E:
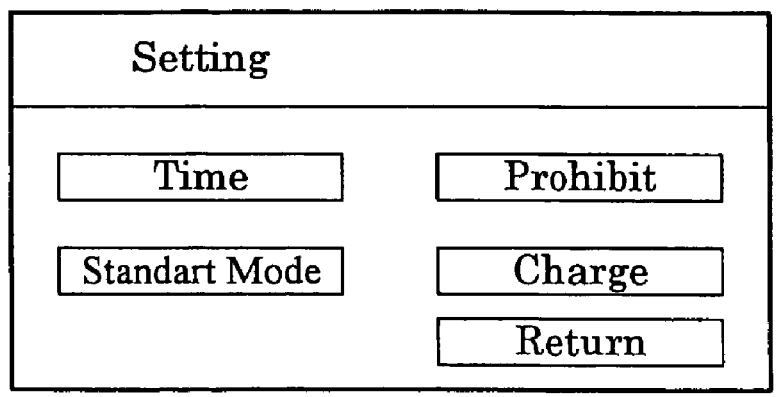
Figure 3F:
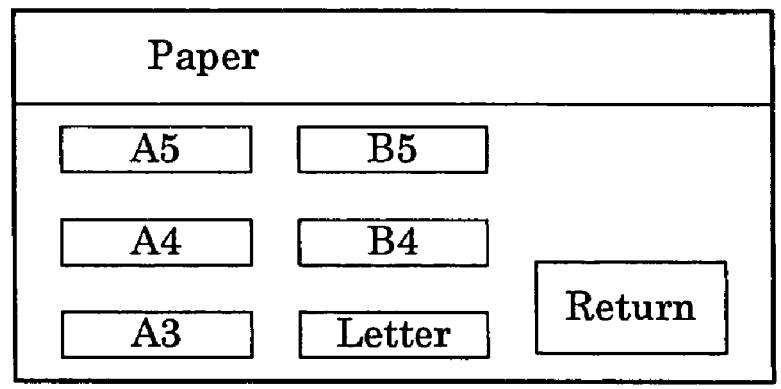

These various settings may be made by means of the manager (i) inputting the secret code to bring up the screen shown in FIG. 3E in which the manager selects the desired type of setting, and (ii) selecting parameter values from those available displayed as shown in FIG. 3F.

The setting of the time frame, the standard mode parameters, the printing charges and the prohibited parameters by the manager may be performed not only through an operation using the operation panel 1300, but also through an on-line operation using a personal computer. For example, such setting may be made by means of a dedicated printing software program or printer driver installed in the personal computer.

Figure 4:
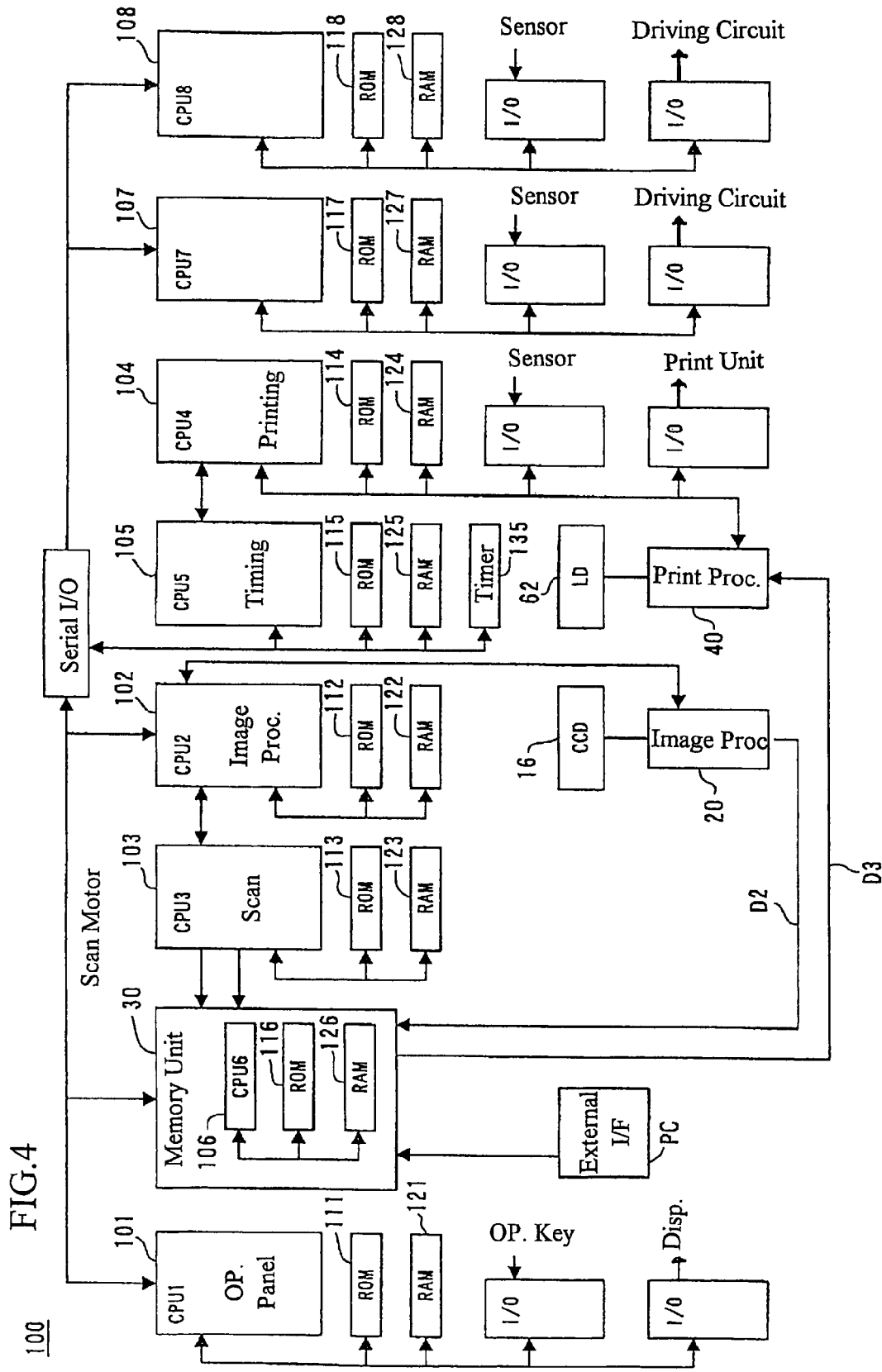
FIG. 4 is a block diagram showing the control unit of the digital copying machine shown in FIG. 1.

FIG. 4 shows the construction of the control unit 100 of the digital copying machine 1.

As shown in FIG. 4, the control unit 100 comprises eight CPUs 101 through 108, as well as other components. Each CPU 101 through 108 has a ROM 111 through 118 in which programs are stored and a RAM 121 through 128, respectively. The control unit 100 also has a clock circuit 135 to identify the current time.

The CPU 106 is located inside the memory unit 30. An external interface (I/F) is connected to the memory unit 30, so that jobs (print requests for original documents comprising multiple pages) may be input from an external device such as a personal computer.

Figure 5:
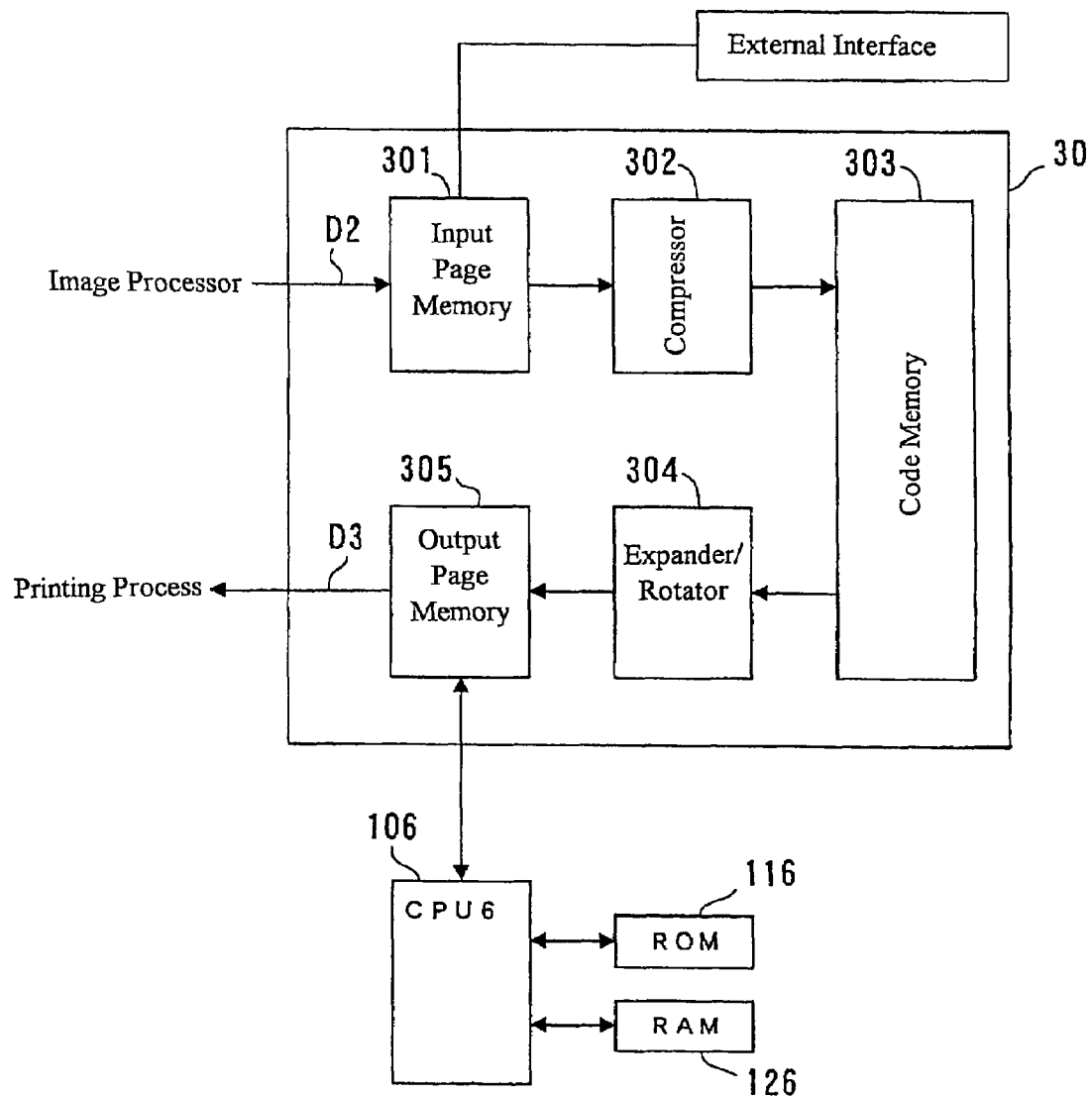
FIG. 5 is a block diagram showing the construction of the memory unit of the digital copying machine shown in FIG. 1.

The print data sent from a personal computer is converted into bitmap data by the controller and stored in the input page memory 301 shown in FIG. 5. The stored print data is encoded in the compressor 302 and saved in the code memory 303. The saved data is sequentially read in the order of printing, compounded in the expander 304, stored in the output page memory 305 and transmitted to the print processor 40.

The CPU 101 performs control regarding the sound signals and display input through the various operation keys on the operation panel OP. The CPU 102 controls the components of the image processor 20. The CPU 103 controls the driving of the scanning unit 10. The CPU 104 controls the page printer PRT, including the print processor 40.

The CPU 105 performs processing for timing adjustment for the entire control unit 100, as well as processing to set the operation mode, and the CPU 107 controls the automatic document feeder 500. The CPU 108 controls the post-printing processing device 600.

Where it is detected by the paper size detection sensors SE11 or SE12 near the paper cassette 80a or 80b that the paper cassette has run out of paper, or where it is detected by a sensor not shown in the drawing that color toner for a particular color has run out, for example, the CPU 105 also prohibits the printing parameter requiring a size of paper that is no longer available, or color copying or color printing. In other words, the CPU 105 automatically registers these printing parameters as prohibited.

The CPU 105 also determines whether or not the print mode for the print job that has been received includes a prohibited parameter. Prohibition of printing parameters may be carried out not only through automatic prohibition in which the printing modes that may no longer be performed are prohibited, but also through manual setting by the manager by means of the operation panel 200, or through an on-line operation from a personal computer. For example, color output or high-volume printing that requires a large number of sheets exceeding a certain number may be prohibited.

The CPU 105 also determines whether the print job has been sent via an external interface or from the image reader IR, to determine whether the print job is in the on-line mode or the off-line mode. It also determines whether the print mode for the print job should be included in the standard mode or the special mode. Based on these determination results, the CPU 105 performs prescribed operations. These operations will be explained in more detail below.

FIG. 5 is a block diagram showing the construction of the memory unit 30.

When an image is captured, image data D2 read in the image reader IR is first transferred to the input page memory 301. The image transferred to the input page memory 301 is compressed by the compressor 302 on an individual page basis, and is then transferred to the code memory 303.

When printing is performed, the compressed image in the code memory 303 is expanded by the expander 304. Where the image needs to be rotated, the image is rotated on a page-by-page basis by means of the rotator 304, so that expansion and rotation take place simultaneously. The expanded image data is transferred to the output page memory 305.

When the image is read from the memory, the image data D3 is transferred from the output page memory 305 to the print processor. These transfers of data, which are indicated by lines with an arrow in the drawing, take place independently of each other and simultaneously, in order to increase the speed of the printing operation, and each set of data is sent via DMA transfer by a DMA controller not shown in the drawing.

The memory unit 30 is controlled by the CPU 106 in accordance with a program stored in the ROM 116. The parameters necessary to activate this program are stored in the system RAM 126.

Figure 6:
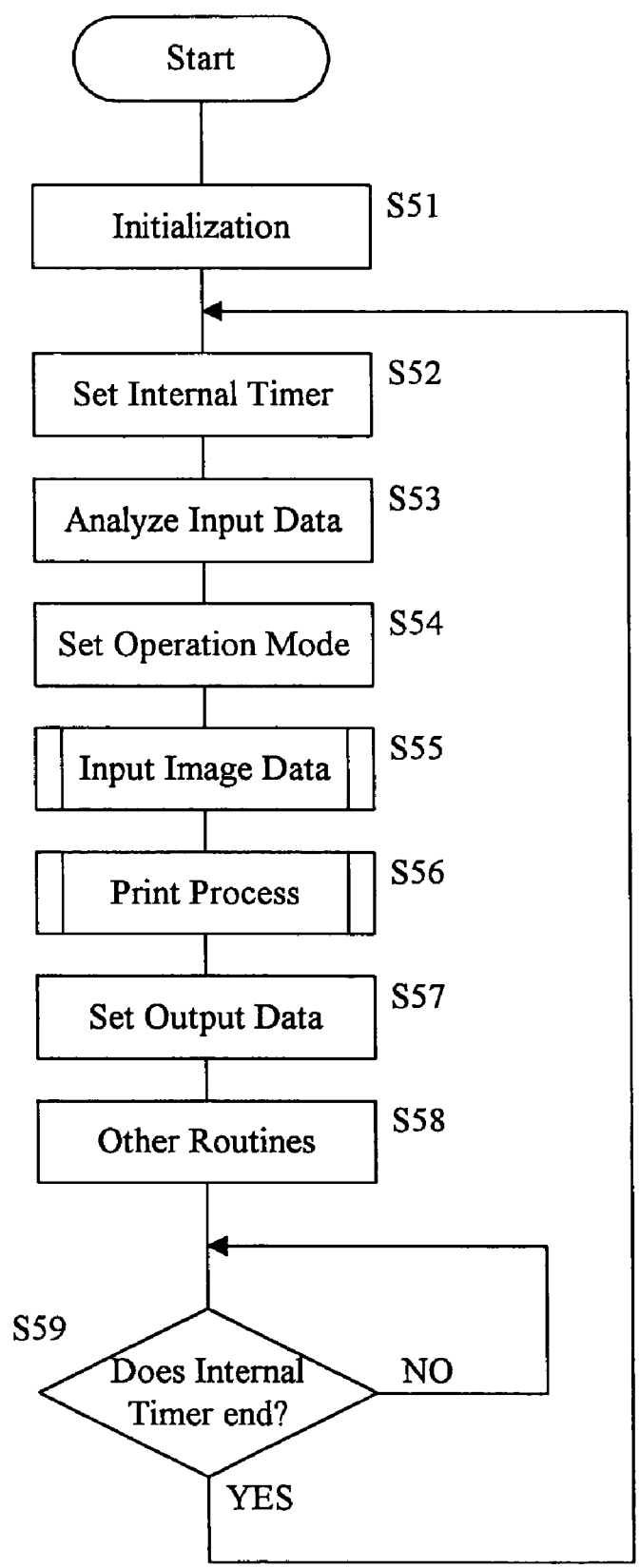
FIG. 6 is a flow chart showing the main routine performed by the CPU that controls the entire digital copying machine.

FIG. 6 is a flow chart for the CPU 105 that is responsible for the overall control of the digital copying machine 1.

After performing initialization (S51), the CPU 105 repeatedly executes setting of the internal timer (S52), the input data analysis routine in which it checks the data input from the other CPUs (S53), the mode setting routine in which the operation mode is determined in accordance with the input parameters (S54), the data input routine (S55), the printing routine (S56), the output data set routine in which the command is held in standby status in the communication port (S57), and other routines (S58), and waits for the internal timer to end (S59).

The control regarding the printing routine S56 shown in FIG. 6 will now be explained with reference to the flow chart of FIG. 7.

In S11, print data accumulation is performed. Specifically, in the case of copying, the image data read by means of the image reader IR is accumulated in the code memory 303. For printing based on a command from a personal computer, image data transmitted from the external device is accumulated in the code memory 303.

In S12, the CPU 105 determines whether or not printing may be enabled. Where it may be performed (YES in S12), the CPU 105 performs the routine to set a charge mode in S13, and executes the printing routine for the image data in S15. Where printing may not be performed (NO in S12), the CPU 105 performs the routine to display a warning on the operation panel 1300 in S14. In this case, actual printing is not performed.

After printing or displaying a warning, the CPU 105 returns to the main routine.

Figure 8:
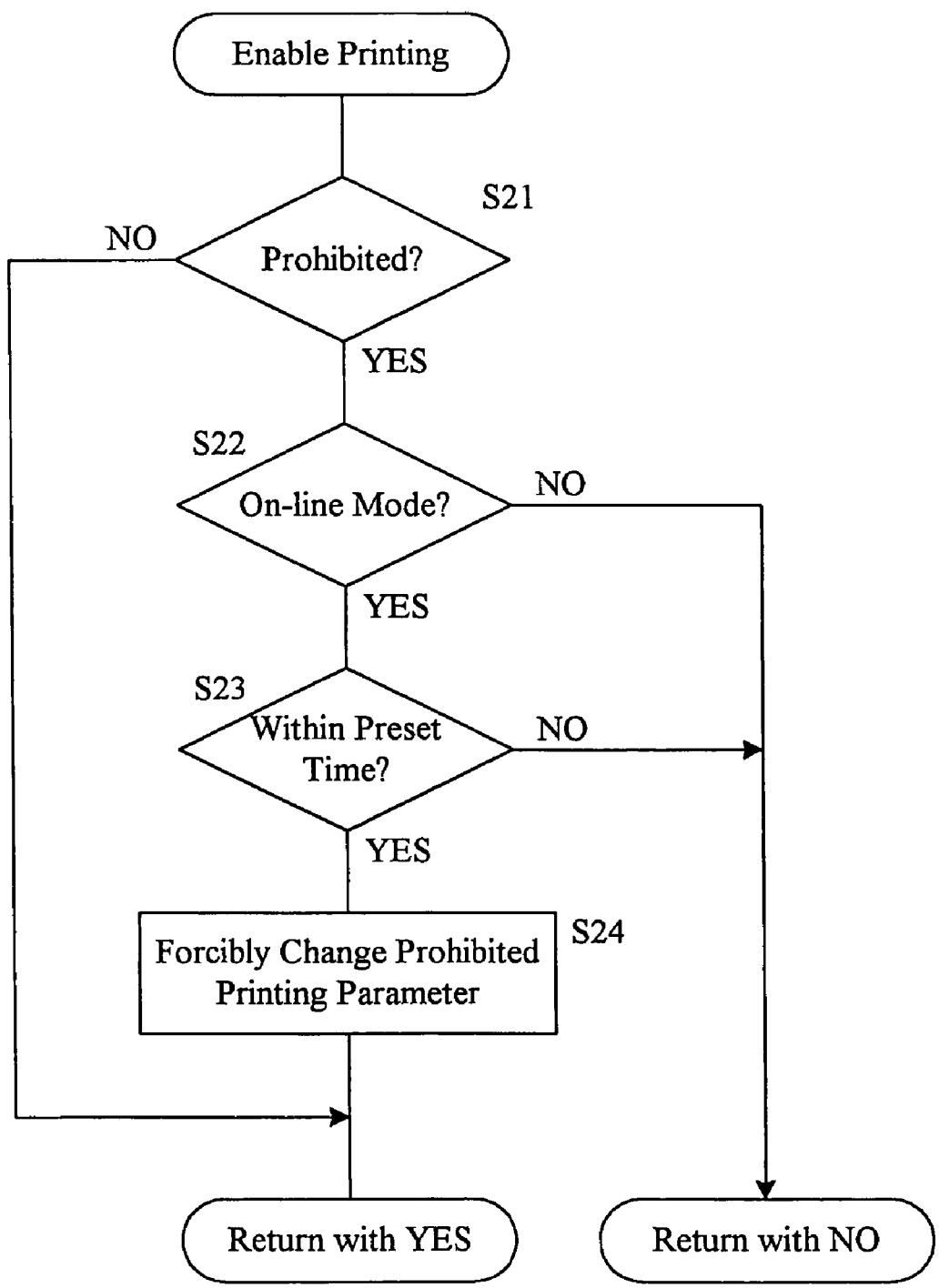
FIG. 8 is a flow chart showing the subroutine to determine whether or not printing may be performed.

FIG. 8 is a flow chart showing the subroutine to determine whether or not printing may be enabled.

Figure 7:
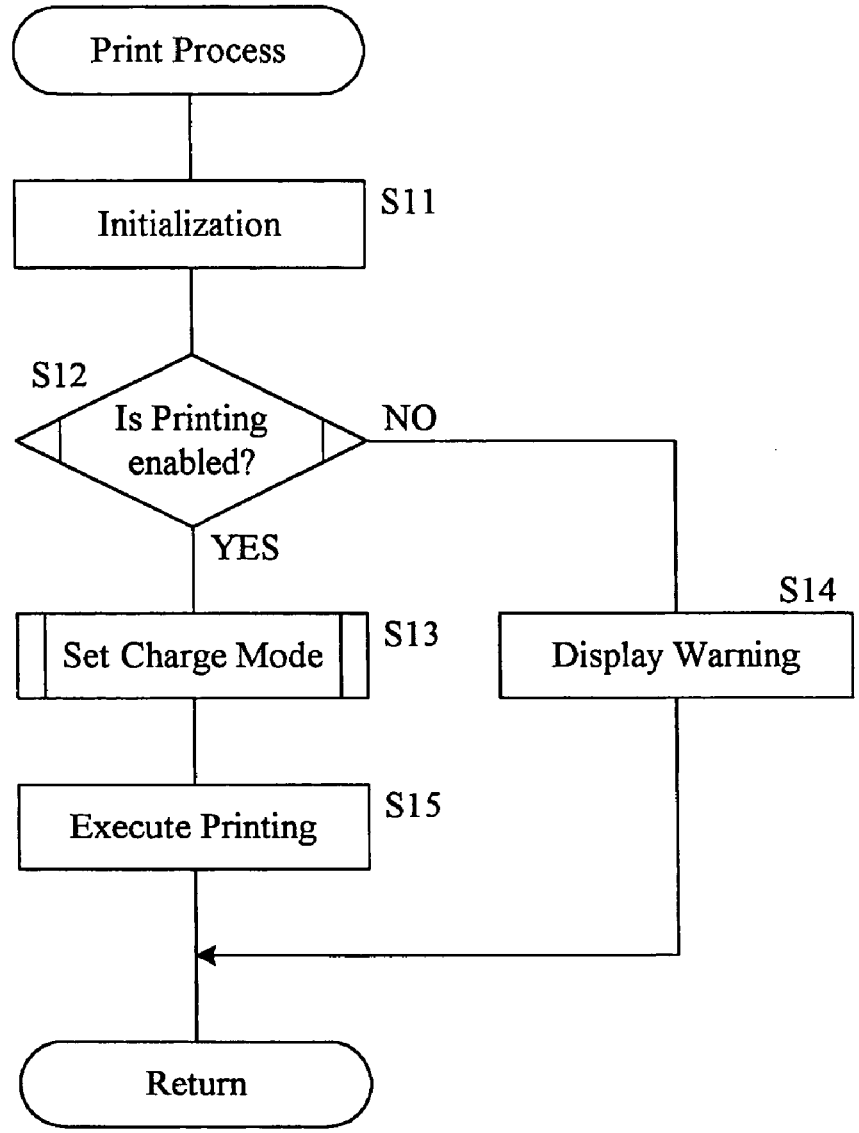
FIG. 7 is a flow chart showing the printing subroutine in the main routine shown in FIG. 6.

In S21, the CPU 105 determines whether or not any of the printing parameters included in the print mode for the print job to be executed is registered as prohibited. An example of such a case is a case in which the paper cassette has run out of A4-size paper, and printing using A4-size paper is therefore registered as prohibited.

Where any of the printing parameters included in the print mode to be executed is prohibited (YES in S21), the CPU 105 determines in S22 whether or not the print job was issued in the on-line mode. If it was issued in the on-line mode (YES in S22), the CPU 105 determines in S23 with reference to the clock circuit 135 whether or not the current time is within the preset time frame. In other words, where a time frame that falls outside the business hours of a print shop or office is specified as the preset time frame, the CPU 105 determines whether the current time is outside those business hours.

Where the current time is within the preset time frame (YES in S23), the CPU 105 in S24 forcibly changes the parameter that is prohibited (printing using A4-size paper, in this example) to another available parameter (printing using paper of another available size, in this example) in the print mode associated with the print job, makes a final determination of YES and returns to the routine shown in FIG. 7. The print job is executed in step S15 of the flow chart of FIG. 7. Therefore, the print job is executed without using printing parameters registered as prohibited, but instead using other available printing parameters.

In addition, it is also acceptable if the entire image data for the print job is deleted to forcibly end the print job instead of forcibly changing the printing parameters.

It is also acceptable if the execution of the print job is prohibited but the print job is maintained in the original form. In this case, the job may be executed when all of the printing parameters included in the print mode for the print job have become available, or it may be maintained until an instruction to execute is issued.

In other words, when the on-line mode is used, where the current time is within the preset time frame and a warning is displayed on the operation panel 1300 of the printer, it is quite likely that there are nobody who can continue the printing after canceling the warning. Consequently, because it is likely that the printer is put on hold for a long time, execution of print jobs using parameters registered as prohibited is not performed.

When the off-line mode is used (NO in S22) or where the current time is outside the preset time frame (i.e., within the prescribed business hours) (NO in S23), it is likely that there is somebody near the printer, and therefore the CPU 105 returns to the routine in FIG. 7 when NO is determined, and advances to S14 in FIG. 7. It then displays a warning instructing that the paper cassette be replenished with A4-size paper, prompting the operator or manager to do so, as shown in FIG. 3D.

If no prohibited printing parameters are included (NO in S21), the CPU 105 determines YES without any conditions, and returns to the routine of FIG. 7.

As described above, where the print command is issued in the on-line mode and the time at which the printer received the print command was within the prescribed time frame (the first operating environment), it is quite likely that there is no one near the printer, and therefore printing using any of the parameters that were registered as prohibited because they would cause the printer to cease operating is not performed. In other words, by changing the parameters to other available parameters, deleting the job itself or putting the job on hold, stable printer operation may be obtained without the printer having to cease operation. On the other hand, where the print command is issued in the off-line mode or the time at which the printer received the print command was outside the preset time frame (the second operating environment), it is likely that someone is located near the printer, and therefore a warning is displayed so that the person can perform the appropriate process.

Figure 9:
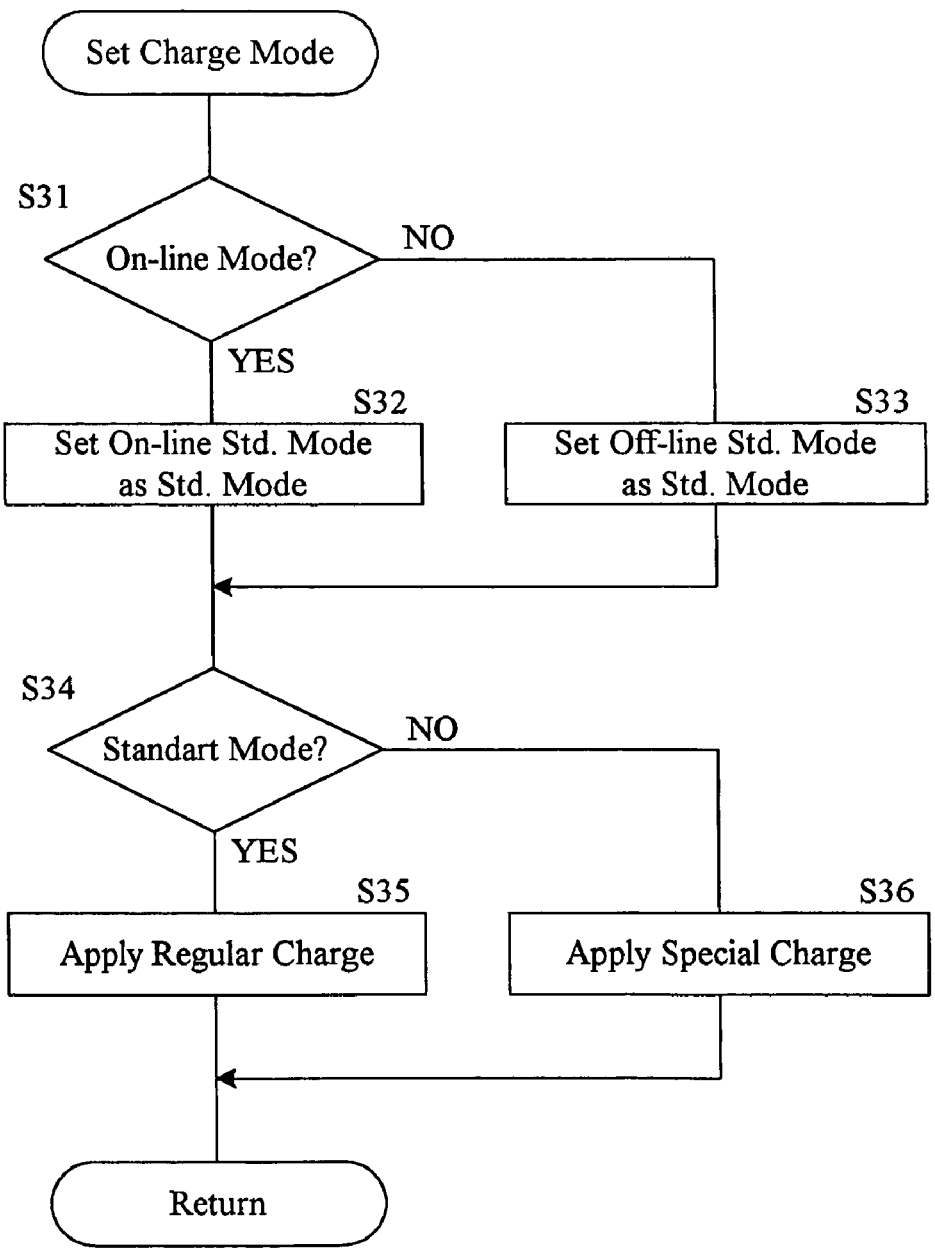
FIG. 9 is a flow chart showing the subroutine to set the charge mode.

FIG. 9 is a flow chart showing the charge mode setting subroutine in S13 of FIG. 7.

In S31, the CPU 105 determines whether or not the mode is the on-line mode. When it is the on-line mode (YES in S31), the CPU 105 sets the on-line standard mode as the standard mode in S32. When it is not the on-line mode (NO in S31), that means the mode is the off-line mode, and therefore the CPU 105 sets the off-line standard mode as the standard mode in S33.

In S34, the CPU 105 determines whether or not the printing parameters in the print mode to be executed match the standard mode parameters. When they match the standard mode parameters (YES in S34), the CPU 105 applies the preset regular charged in S35. When the parameters do not match the standard mode parameters (NO in 834), the CPU 105 applies a preset special charge, which is higher than the regular charge, in S36. Through this processing, a charge that is appropriate for the print mode and the required level of maintenance and control may be set.

In the embodiment described above, an example was given in which the operating environment is identified depending on whether the current time is within the preset time frame, but the present invention is not limited to this implementation. For example, data regarding whether the host computers connected to the printer in a LAN environment are activated, or the number of such host computers, or data input in the client computers showing that the administrator in a LAN environment is absent may be sent to the printer interface. By checking the data that it has received, the printer may determine that it is in an environment in which paper or toner may not be immediately replenished.

For example, if the number of computers connected or activated exceeds a prescribed number, use of the printing parameters registered as prohibited becomes prohibited. Where the network administrator is absent, use of the printing parameters registered as prohibited become prohibited.

In the embodiment, prohibited printing parameters are set in either of the two operating environments, i.e., either within or outside the preset time frame, such that different modes are executed depending on whether the current time is within or outside the preset time frame, but it is also acceptable if prohibited parameters are set only within the preset time frame.

Using this construction, since difference charges may be set for the standard print mode and other print mode, the charge may be charged in accordance with the number of manpower that are required during maintenance by the manager.

Obviously, many modifications and variation of the present invention are possible in light of the above teachings. It is therefore to be understood that within the scope of the appended claims, the invention may be practiced other than as specifically described.

What is claimed is:

1. A printing system including a printer that operates in either a first operating environment or a second operating environment that is different from the first operating environment, the first operating environment being a first time period and the second operating environment being a second time period, the second time period not overlapping with the first time period, the printing system comprising:
   a print parameter prohibiting means that prohibits use of a printing parameter associated with a print job;
   an operating environment detector that determines whether the printer operating environment is the first operating environment or the second operating environment;
   a parameter determiner that receives a print job and determines whether a printing parameter to be used in the print job is prohibited by the print parameter prohibiting means;
   a controller that, when the parameter determiner determines that a print job has a printing parameter that is prohibited, prohibits processing of the print job having the prohibited print parameter on condition that the operating environment determining means detects that the environment is the first operating environment and the print job is issued when the printer is operating in an on-line mode.

2. The printing system as claimed in claim 1, wherein the controller forcibly cancels the printing parameter that is prohibited and changes the parameter to another available printing parameter to perform the print job.

3. The printing system as claimed in claim 1, wherein the controller forcibly deletes the print job including the printing parameter that is prohibited.

4. The printing system as claimed in claim 1, wherein the controller goes on keeping the print job including the printing parameter that is prohibited.

5. The printing system as claimed in claim 1, where a printing parameter is determined by the parameter determiner to be prohibited and the operating environment is determined by the operating environment determining means to be the second operating environment, the controller displays a warning message.

6. A printing system including a printer that operates in either a first operating environment or a second operating environment that is different from the first operating environment, the printing system comprising:
   a print parameter prohibiting means that prohibits use of a printing parameter associated with a print job;
   an operating environment detector that determines whether the printer operating environment is the first operating environment or the second operating environment;
   a parameter determiner that receives a print job and determines whether a printing parameter to be used in the print job is prohibited by the print parameter prohibiting means;
   a controller that, when the parameter determiner determines that a printing parameter is prohibited and the operating environment determining means detects that the environment is the first operating environment, prohibits processing of the print job using the print parameter that is prohibited;
   a standard mode setting means that sets standard print mode,
   a printing charge setting means that sets different charges for the standard print mode and for other print mode, and
   a standard mode determiner that determines whether or not a printing parameter of a print job to be executed by a print command matches the parameter included in the standard print mode,
   wherein the printing charge is determined based on the result of the determination by the standard mode determiner.

7. The printing system as claimed in claim 1, further including a designator that designates the first operating environment and the second operating environment.

8. The printing system as claimed in claim 7, wherein the designator designates a time period.

9. The printing system as claimed in claim 1, wherein the operating environment detector determines environment based on an environment of a network to which the printer is connected.

10. The printing system as claimed in claim 1, wherein the print parameter prohibiting means operates according to a detection detected by a sensor located in the printer.

11. The printing system as claimed in claim 1, wherein the print parameter prohibiting means operates by a manual operation by a user.

12. The printing system as claimed in claim 1, wherein the print parameter prohibiting means is located in the printer.

13. The printing system as claimed in claim 1, wherein the print parameter prohibiting means is a program installed in a computer that transfers the print job to the printer.

14. A print job management method of a printing system including a printer that operates in either a first operating environment or a second operating environment that is different from the first operating environment, the first operating environment being a first time period and the second operating environment being a second time period, the second time period not overlapping the first time period, comprising steps of:
   setting a prohibited printing parameter associated with a print job;
   detecting whether a printer operating environment is the first operating environment or the second operating environment;
   determining whether a printing parameter of the print job is prohibited; and
   prohibiting processing of the print job having the prohibited print parameter, when the determining step determines that a printing parameter is prohibited on condition that the detecting step detects that the environment is the first operating environment, and the print job is issued when the printer is operating in an on-line mode.

15. A printing system including a printer, comprising:
   an operating environment setting means that sets a first operating environment as the operating environment for the printer, as well as a second operating environment that is different from the first operating environment, the first operating environment being a first time period and the second operating environment being a second time period, the second time period not overlapping the first time period;
   a print parameter prohibiting means that prohibits the use of printing parameters associated with a print job;
   an operating environment detector that determines whether the printer operating environment is the first operating environment or the second operating environment;
   a parameter determiner that determines whether or not a printing parameter of a print job is prohibited by the print parameter prohibiting means; and
   a controller that, when the parameter determiner determines that a print job has a printing parameter that is prohibited, executes a different print mode based on the determination by the operating environment detector on condition that the print job is issued when the printer is operating in an on-line mode.

16. The print job management method of claim 14, further comprising designating the first operating environment and the second operating environment.

17. The printing system of claim 15, further comprising a designator that designates the first operating environment and the second operating environment.

* * * * *